UNITED STATES PATENT OFFICE.

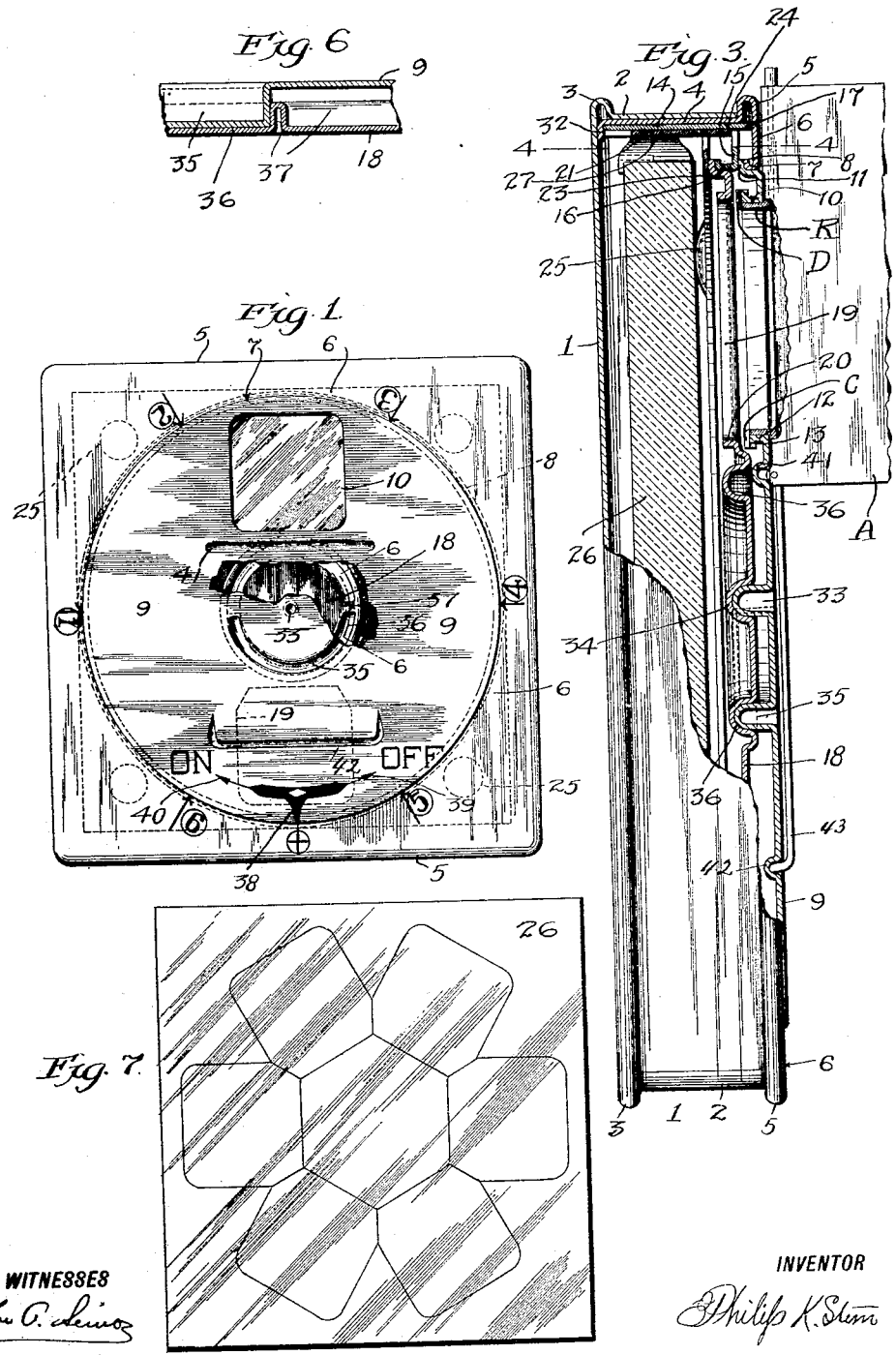

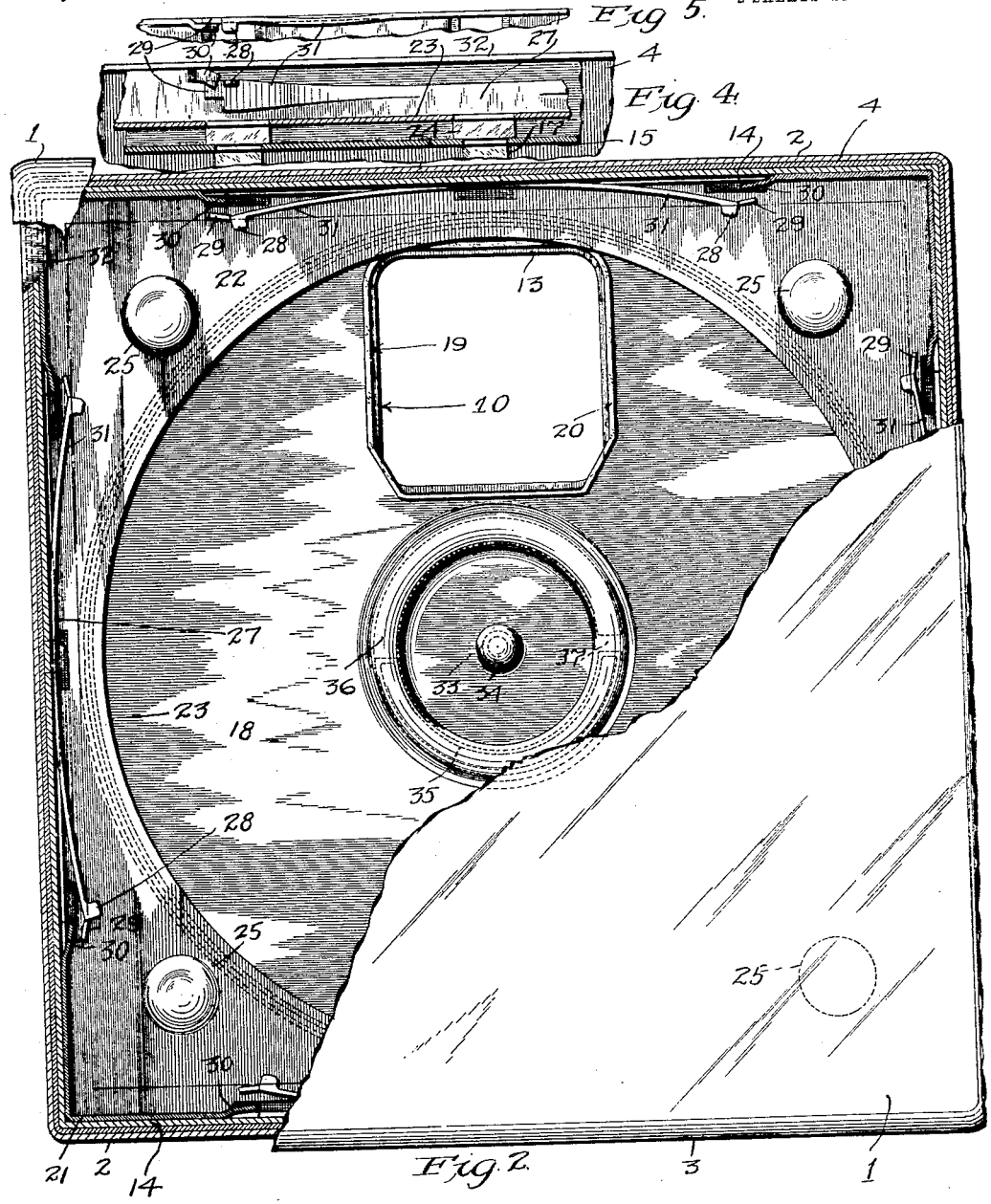

PHILIP K. STERN, OF NEW YORK, N. Y.; ELIZABETH L. STERN EXECUTRIX OF SAID PHILIP K. STERN, DECEASED.

PHOTOGRAPHIC-PLATE HOLDER.

1,127,539.  Specification of Letters Patent.  Patented Feb. 9, 1915.

Application filed April 1, 1913. Serial No. 758,253.

*To all whom it may concern:*

Be it known that I, PHILIP K. STERN, a citizen of the United States, residing in the city, county, and State of New York, have invented certain new and useful Improvements in Photographic-Plate Holders, of which the following is a specification.

My invention in photographic plate holders relates to that type known as permutation plate holders, and more particularly in this connection, to revolving plate holders, whereby upon the rotation thereof, a series of consecutive exposures of the involved sensitized photographic material may be made.

The principal feature of my invention lies in its application to photographic hand cameras, adapted to the use of dry plates, since it permits of the taking of consecutive pictures upon a plate with as great facility as those taken upon roll-film. It moreover possesses equal opportunity for daylight loading.

The object of my invention is to provide a simple and inexpensive plate holder, applicable to photographic cameras, whereby dry plates may be employed to an advantage equal to that of roll-film, and moreover, to provide at the same time, a light-proof plate package, which may be utilized for the additional purpose of a light-tight developing vessel within which the plate may be treated, in the process of development and fixation.

A further object of my invention, is to establish a system of light-proof plate containers, which may be of sufficiently inexpensive construction to be discarded after once used.

The features characteristic of my invention whereby I attain these objects, are fully set forth in the accompanying specification and drawing, forming part thereof, and the distinct features of novelty are referred to in the claims at the conclusion of the specification.

With reference to the drawings:—Figure 1 is a front elevational view of my improved plate holder, of substantially full pocket-size, showing a fragment of the center bearing of the shutter as being removed. Fig. 2 is an enlarged rear elevational view thereof, with a portion of the cover broken away, together with a corresponding part of the perimeter. Fig. 3 is a side elevational view thereof, with a section of the end nearest the observer removed, and in addition, illustrating the connection between the photographic camera and the plate holder aperture. Fig. 4 is a fragmentary, side elevational view of a portion of the side of the plate holder, taken on the lines 4—4 of Fig. 3. Fig 5 is a fragmentary plan detailed view of a plate spring and catch, shown in Fig. 4, in accordance with my invention. Fig. 6 is a fragmentary, enlarged detailed view of a section of the center bearing members, taken on the line 6—6 of Fig. 1, and Fig. 7 is a front elevational view of a photographic plate, illustrating the picture divisions as effected by the index of the holder.

In the several figures, similar characters of reference indicate like or the same parts throughout where they occur, wherein, 1 designates the plate holder cover, which is construced preferably of light sheet metal, and is drawn, stamped or otherwise formed, to provide a neck 2, and an annular projecting flange 3.

Slidingly fitting the plate holder cover 1, in telescopic relation, within the neck 2, is a body 4. This is formed in a similar manner to that of the cover 1, and is provided with a corresponding annular abutment rim 5, which receives the thrust of the free end of the neck 2. Formed integral with the body 4 and rim 5, is an open window frame 6. This frame has a concentrically formed circular sash 7, which is turned inwardly and bent to form a flanged rim 8. Within the sash 7 and fitted for rotation is a revolving shutter 9, provided with a window 10. The shutter 9 is flanged over on the edge to correspond with the rim 8, and is again flanged outwardly at the free edge to form an annularly projecting abutment 11. The window 10 is flanged inwardly to provide a neck 12, the free projecting terminal of which is reinforced by turning it over substantially at right angles, to form a stiffening frame 13.

Within the body 4, and fitted thereto in telescopic relation, is an inner body 14. This is provided with an integral secondary window sash 15, and a secondary rim 16, of substantially the same formation as that of the sash 7 and rim 8.

Sheared and bent down from the secondary sash 15 are a series of alternately disposed legs 17, which bear against the inner surface of the window frame 6. These are of sufficient length to space the frames 6 and 15 at the desired distance apart to provide for the free rotation of the shutter 9 within the sash 7, as will be more fully explained. Within the secondary rim 16 is an inner or secondary shutter 18, mounted in a similar manner therein to that of the shutter 9 within the rim 8, and is provided with a window 19.

Telescopically engaged with the inner body 14, is an inner wall or lining 21. This is provided with a bottom frame 22, which has open secondary rims 8 and 16 respectively. The bottom frame 22 bears lightly against the rim 16 of the secondary shutter 18, and the secondary window sash 15 bears lightly against the abutment 11 of the rim 8, thereby securing sufficient frictional engagement, to obviate the rotation of either of the shutters 9 or 18 by slight jars or vibration, while at the same time, the abutments 11 of either of the shutters 9 or 18 will restrict the outward displacement and maintain the position of said shutters within their respective sashes and frames. The bottom frame 22 is moreover sheared out and bent down at intervals to provide supporting legs 24, which bear against the inner surface of the secondary window sash 15 and effects the spacing of the inner wall or lining 21.

Spaced at four points around the window sash 23, at equal distances from each other, are studs or stops 25. These are pressed inwardly from the outer face of the bottom frame 22, and project to form a support, for the involved photographic dry plate, designated 26, and position it in the focal plane of the holder.

The wall or lining 21, has sheared out plate-positioning springs 27. These are, in the instance illustrated, four in number, and are positioned at, substantially, equal distances apart and intermediately with respect to the inner wall or lining 21. These springs are provided with terminal integrally formed lugs 28, which are bent or folded from the edge of the springs 27, after the same have been blanked in the process of manufacture. The function of these lugs, is to overlap the edge of the dry plate 26 when positioned within the holder, and to bear the same down against the studs 25 in securing the position of the plate 26 in the focal plane of the holder.

Integral with, and projecting from the free ends of the respective springs 27, are terminal tails 29, and integrally formed from the inner wall 21, are bent lugs 30. These are turned over inwardly, to provide catches, with which to engage and withhold, the terminal tails 29, and thereby maintain their respective springs 27, temporarily against the inner body 14, and away from the dry plate 26, during the operation of loading the plate holder.

The springs 27, are blanked and sheared in a manner, as to form semi-elliptic spring leaves 31. These are bowed inwardly, in order that the requisite attention may be given them, when they are positioned against the plate 26, to afford sufficient resisting pressure thereto against displacement. They are also sprung downwardly, or in a direction toward the bottom frame 22, sufficiently, to force the dry plate 26 firmly against the focal plane studs 25, to insure the requisite engagement therewith.

The inner body 14, together with the lining 21, is held in position within the body 4, by an integral flange 32, which is turned over on all four sides and brought to bear firmly down upon and over the free edge of the inner body 14, as well as, upon and over the corresponding edge of the inner wall 21.

The shutter 9 and secondary shutter 18, are each provided with a center bearing, which mutually engage each other, and consist respectively, of a pressed boss 33, projecting inwardly, from the inner surface of the shutter 9, and a corresponding socket 34 pressed inwardly from the inner surface of the secondary shutter 18. The said boss and socket, fit each other for free rotation.

The shutter 9 engages the secondary shutter 18, in driving relation, through an annularly disposed inwardly depressed rib 35, engaging in a corresponding annular socket 36, formed in the secondary shutter 18. The rib 35 is disposed in crescent formation, and is positioned substantially opposite the window 10, and occupies one half of the circumference of the socket 36, with which it is engaged, in coupling relation. The annular path of the socket 36 is interrupted by an abutment 37, which is positioned in a line radial from the center bearing socket 34 and parallel with the adjacent edge of the window 19. The relation of the rib 35 and abutment 37 is such, that upon rotating the shutter 9, in the direction of the indicating arrow pointing to the word "Off," in Fig. 1, the end of the rib 35 opposite to said arrow, will be brought into contact with the abutment 37, and upon continuing the movement of the shutter 9, the secondary shutter 18 will be driven and carried around in the same direction. Upon imparting a reverse movement, to the shutter 9 however, and continuing the said movement for one-half of a revolution, the contacting end of the rib 35 shall have become disengaged from the abutment 37, and the opposite end of the said rib, or that end adjacent to the arrow indicating the word, "On," will be brought into contact with the opposite face of the abutment 37, when it will be observed the shutter 9 has alone been moved, while the shutter 18 has remained stationary. This reverse movement for one-half of a revolution, of the shutter 9 brings the windows 10 and 19 into a position of register, and thus opens the plate holder, for the passage of light, to the dry plate 26, when the making of an exposure may be effected.

Upon continuing the rotation of the shutter 9 to effect the requisite movement for the spacing of a second consecutive exposure, the engaging end of the rib 35 with the abutment 37, shall have carried with it the secondary shutter 18, while the windows 10 and 19 have been in register. At equal intervals around the sash 7, is an index, arranged in the manner of a dial, consisting in the instance illustrated, of six equal divisions, accompanied by the numerals 1, 2, 3, 4, 5, 6, and radial indicating pointers, together with a zero character intermediately situated with respect to the numerals 5 and 6, and consisting of a crossed horizontal and vertical line.

On the shutter 9, is a radially disposed pointer 38 intermediately branched from two oppositely directing, annularly disposed rotation pointers 39 and 40 respectively. The pointer 39 is directed to the word "Off", and 40, to the word "On." The pointer 38 provides an index register for dividing the involved dry plate 26, as directed by the indices, into six equal exposure divisions and for bringing the windows 10 and 19 into the position of registration and conversely, for bringing the said windows into a cut-off position, when the holder is detached from the camera, or when it is required that the same should be made light-tight.

In the position illustrated in Fig. 1, which indicates the windows 10 and 19 in a position, diametrically opposite each other, the plate holder will be light-tight.

Notwithstanding the fact that the shutters 9 and 18 do not lie in contact with each other sufficiently close to effect a light seal; a light seal, however is effected between them, and any light entering the window 10 is cut off from passing between the shutters 9 and 18 and gaining access to the plate holder through the window 19, by the interposition of the crescent rib 35 and engaged socket 36. It will be thus understood that any oblique or other rays directed between the shutters 9 and 18 toward the window 19, will be eclipsed by the axis coupling, comprising the rib 35 and socket 36, since these members are of a diameter greater than the width of the windows 10 or 19, taken in a plane coincident with the plane of these windows. Oppositely situated with respect to the rib 35, upon the shutter 9, and parallel with the adjacent edge of the window 10, is a transverse rib 41. This is provided for the reception of a positioning projection of a photographic camera, designated "A", with which my improved plate holder is engaged. Below the rib 35, upon the shutter 9, is an inwardly depressed rib 42 adapted to receive the lower end portion of a positioning rod 43 secured at its upper end to the camera "A."

A light-tight connection between the camera "A", and the plate holder, at the window 10, is secured by a rabbet "R", telescopically engaged with the neck 12, and the camera "A" is secured to my improved plate holder by a catch-hook "C" and a release catch "D".

After the plate holder has been positioned on the camera "A", and it is desired to make preparations for the first exposure, and assuming the pointer 38 to be at the zero mark, it will be necessary to rotate the plate holder in the direction as indicated by the arrow 40 for one-half of a revolution. This will bring the windows 10 and 19 into registration with each other.

Upon continuing the rotation, and observing the pointer 38 as it passes the numerals 3, 4, 5 and 6, until it arrives at the leader of the numeral 1, the holder will be in position for making the first exposure upon the dry plate 26, and upon further continuing the movement of the holder, in order to bring the pointer 38 to the leader of the numeral 2, and consecutively of the numerals 3, 4, 5 and 6, the relation of the registered windows 10 and 19, with respect to the dry plate 26 shall have been such, as to divide the latter into six equal exposure sub-divisions, as depicted in the illustration Fig. 7.

When it is desired to detach the plate holder from the camera, the same should first be made light-tight by rotating the same in the direction indicating "Off." This is effected by reversing the direction of rotation, as indicated by the pointer 39, until the pointer 38 arrives at the zero mark, when the windows 10 and 19 shall have been positioned diametrically opposite each other, and into that which they assumed prior to making the exposure positions referred to, after which, the plate holder may be removed from the camera, when it will again assume the condition of a light-tight photographic package.

It is the purpose of my invention to provide these plate holders, loaded with photographic dry plates and placed upon the market as a new photographic supply, in which instance, the plates are loaded in the holder in the operation of packing in the factory. In any event, however, the loading or reloading of the holder is effected by first prying off the cover 1 from the body 4, and setting the springs 27 back against the inner body 14 and temporarily latching them by the bent lugs 30 and tails 29, as indicated in the illustration Fig. 5, after which, a plate, film, or film and support, is laid down upon the studs 25, whereupon, the springs 27 are positioned in successive order respectively on and against the sensitized photographic material or the support therefor, after they have been released from their restraining lugs 30.

The operation is expedited by bringing the opposite lugs of one of the springs 27, first into contact with the plate or film support. This will force it down on to the studs 25, as well as, thrust it laterally toward the opposite side of the holder. Upon forcing the plate back against the action of the spring, sufficiently, to provide the necessary space between the edge of the plate and the inner frame, to accommodate the thickness of the spring and the fingers of the operator, a second holding and positioning spring 27 is snapped on to the opposite edge of the plate and thus the latter will be clamped between two diametrically oppositely disposed tension springs 27, and will be sufficiently secured by the downward pressure of the springs, to maintain it in contact with the studs 25.

Owing to the limited amount of margin between the perimeter of the picture circle, and the edge of the dry plate, it is necessary to position the plate 26 centrally within the holder. To accomplish this purpose, I have introduced two pairs of four, of these plate holding and positioning springs, arranged in quadrature, whereby a pair of lateral springs are similarly positioned and snapped on to the plate 26, when the latter will be held effectively by four springs tending to bring the position of the plate into that of centralization with respect to the holder, and thus, a uniform margin around the picture circle and the edge of the dry plate is afforded. After the plate 26 has been engaged by the four holding and positioning springs 27, and the shutters 9 and 18 are in light-tight relation, and as indicated in Fig. 1, the cover 1 is forced down over the body 4, until the edge of the neck 2 abuts with the shoulder 5. In this condition, the holder may be exposed to the most actinic light without impairing the involved plate.

It will be understood that a plate package, comprising my improved holder and involved dry plate presents a compact form and protects the involved plate effectively against the attacks of moisture, and thereby secures certain advantages in transportation, and distribution.

It will be observed that the shutter 9 protrudes slightly beyond the plane of the window frame 6; the purpose of which is to provide a limited amount of clearance for the photographic camera "A", when the holder is being rotated.

Owing to the frictional engagement of the abutment 11 with the secondary window sash 15, accidental rotation of the shutter 9, which might be occasioned by a jar or other disturbance, is obviated, and moreover, due to the frictional engagement of the secondary rim 16, with the bottom frame 22, the secondary shutter 18 is restrained against such rotation, until positive engagement between either end of the rib 35 and the abutment 37 has been effected. It will be thus understood that accidental displacement of either of the shutters 9 or 18 is substantially obviated.

It will be observed by the foregoing description of my invention that the novel plate holder presented provides a simple and inexpensive construction, whereby a plurality of consecutive exposures may be effected on a commercial dry plate, with the greatest of facility and ease in manipulation, and provides, at the same time, a new article of manufacture in the photographic industry, whereby a light-proof package for plate exposures is presented. Moreover, it will be understood, that the entire holder containing the plate may be employed as a daylight developing tank by merely immersing the holder, together with its contents into a suitable developing box. By plunging the holder containing the plate edgewise down into a flat developing box, the liquid developing solution will enter the interior of the holder through the window 10 and force the imprisoned air ahead of it, until it finds its escape through the window 19 and between the shutters 9 and 18. Meanwhile the liquid developing solution will rise and reach the edge of the window 19 adjacent to the window 10 and flood the interior of the plate holder to that level, whereupon, it will continue to rise until the entire plate has been flooded in such solution.

After the developing process, the holder, together with the plate, is removed and similarly plunged into a box containing water, and finally transferred and plunged into a similar box containing the fixing solution. Thus it will be understood that the plate holder not only presents novel features as a plate holder, but in addition, provides the necessary qualifications for a daylight developing tank. Since the entire holder, including the springs 27 may be struck up in a suitable punch press by punches and dies from light sheet metal, an inexpensive construction is provided which may be purchased at a sufficiently low figure, to warrant the throwing of the holder away, after the contained plate has been developed and fixed, and Having fully described my invention, I claim as new and desire to secure by Letters Patent of the United States:

1. In a photographic plate holder, a body portion and a cover telescopically engaged therewith, the body portion being provided with a plurality of annularly disposed inwardly acting plate positioning and holding springs formed integral with the body portion.

2. In a rotatory plate holder, a pair of rotatory mutually engaging superimposed shutter disks, each being provided with an open window, and mutually over-lapping light cut-offs forming a portion of said disks.

3. In a rotatory photographic plate holder, a pair of rotary shutter disks, each provided with a normally open window, and a covering portion, and a lateral light cut-off between the windows.

4. In a rotatory plate holder, a body portion, an inner lining therefor, a pair of rotatory shutter disks carried by the body and lining respectively, windows in each of the shutter disks, adapted to register with each other, an axis coupling member on each in mutual engagement, a lateral light cut-off member on each, and plate positioning and holding springs, carried by the lining, and a cover for the whole.

5. In a photographic plate holder, an outer casing, of substantially rectangular formation, and having a circular aperture therein, a rotatory shutter, carried within the aperture, a second casing within the first, having a corresponding circular aperture and a shutter carried thereby, an axis coupling on each in mutual engagement, and in driving relation, an inner casing provided with a plurality of plate positioning springs, adapted for inward and outward action, and a cover for the whole.

6. In a photographic plate holder, the combination with the body, of a pair of superimposed rotatory shutters, each being provided with a window, and a covering portion, and mutually engaging axis coupling members, an index upon the casing, and an indicator upon one of the shutters, adapted to register with the index, of an inner frame, provided with a plurality of plate holding and positioning springs, and of a cover for the whole.

7. In a photographic plate holder, a rectangularly formed body portion, provided with a marginal abutment rib, a cover telescopically engaged to the body portion, provided with a corresponding rib, a similarly formed inner body, provided with an integral end, having a circular perforation, there being a corresponding perforation in the body portion, a rotatory shutter in each, an axis coupling for the shutter, a lining within the inner body, having an integral bottom frame, focal plane stops, formed from the bottom frame and projecting within the holder, springs disposed around the lining, and formed integral therewith, adapted to position and hold a plate within the holder, against said focal plane stops, together with a center bearing member in each of the said shutters.

8. In a photographic plate holder, an outer frame and an inner frame, each having a circular aperture, a rotary shutter, provided with a window in each of the apertures, an axis coupling and light shield between the shutters, one of said shutters adapted to drive the other therethrough, an inner frame provided with focal plane studs, and integral marginal plate holding and positioning springs, and spring-withholding catch members respectively on the body and springs, adapted to withhold the latter in a disengaging position.

9. In a photographic plate holder, the combination with the body of a plurality of marginal plate holding and positioning springs, formed integral with the body, and of spring withholding catch members on the body, adapted to engage and withhold the springs in a disengaging position.

10. In a permutation photographic plate holder, an outer casing, a dual rotary shutter, provided with a window, an axis coupling and a driving member carried thereby, and forming a portion of said dual shutter, together with annular frictional restraining flanges and light abutments, and internal plate holding and positioning springs arranged within said outer casing.

11. In a revolving plate holder, a rectangularly formed frame, provided with a dual rotary shutter, having mutually registering windows and light cut-offs therebetween, and a plurality of plate holding and positioning springs formed integrally with the rectangular frame.

12. A permutable photographic plate holder, comprising a rotatory rectangular box, having an inner and outer framework, and circular apertures in each of the frames, a circular shutter disk in each of the apertures, provided with mutually registering windows and covering portions therefor, and mutually engaging axis coupling members, together with plate holding and positioning devices, and an index dial on the outer frame coacting with the outer shutter disk.

13. In a photographic plate holder, an outer and inner frame, each having a circular aperture, a rotatory shutter disk, provided with a window mounted in each of the apertures, an axis coupling and light shield between the shutter disks, comprising a driving rib and abutment respectively; said disks adapted for engagement, upon the rotation of the outer disk, during a partial revolution thereof in either direction, and adapted to drive the inner disk in either direction through the rotation of the outer disk upon a further increment of the said rotation, substantially as described.

disk in either direction through the rotation of the outer disk upon a further increment of the said rotation, substantially as described.

In testimony whereof, I have signed my name to this specification in the presence of two subscribing witnesses.

PHILIP K. STERN.

Witnesses:
 E. L. STERN,
 R. H. TUBBS.

Copies of this patent may be obtained for five cents each, by addressing the "Commissioner of Patents, Washington, D. C."